Patented Feb. 9, 1943

2,310,676

UNITED STATES PATENT OFFICE 2,310,676

RUBBER COATING

Paul L. Bush and Dale E. Lovell, Mishawaka, Ind., assignors to Mishawaka Rubber and Woolen Manufacturing Company, Mishawaka, Ind., a corporation of Indiana No Drawing. Application July 10, 1939, Serial No. 283,638

8 Claims. (Cl. 117—139)

This invention relates to finishing coatings for rubber goods and has reference more particularly to coatings of the lacquer type which are dried by evaporation of solvents and baked on the rubber as the latter is cured.

In certain classes of rubber goods, such as rubber coated fabrics for upholstery, carriage tops, and the like, it is necessary to employ a coating for the rubber surface to produce the required finish, it being the prevailing practice to use a lacquer coating which is dried and baked on the rubber during vulcanization. Such coatings, however, as now used, have an undesirable slowing action on the rubber cure which has a deteriorating effect on the quality of the rubber, lowering the tensile and wearing qualities thereof. It is also difficult to obtain a satisfactory slip or feel on lacquers which are applied to rubber previous to vulcanization, the surface of these lacquers having a more or less tacky feeling and susceptibility to marring.

Increasing the curing materials in the rubber compound does not satisfactorily compensate for the retardation of cure and deterioration of rubber quality occasioned by the coating as it ordinarily increases the tendency to cause undesirable over cure whereas usual methods of imparting sufficient hardness to the coating to improve the feel and satisfactorily resist abrasion decreases the capability of the coating to withstand bending strains.

The principal objects of our invention are to provide an improved coating of the above type which is particularly applicable to rubber goods and avoids retardation of the rubber cure and undesirable effects thereof on the rubber experienced with the coatings heretofore available. In addition, our invention seeks to provide a lacquer with greater resistance to abrasion and better bending characteristics and increases the adhesion or bonding of the lacquer to the surface on which it is applied.

These as well as other objects or advantages hereinafter pointed out are accomplished, according to our invention, through a modification of the lacquer coating by adding thereto a quantity of rubber vulcanizing agent and a quantity of rubber vulcanization accelerator. Neither the vulcanizing agent nor the accelerator alone appears to be sufficient and neither is the invention applicable to oil base varnishes which dry primarily by oxidation, but our experiments do indicate that it is applicable to any spirit varnish or lacquer which dries primarily by evaporation of solvents and is suitable for baking on rubber during vulcanization thereof.

A coating or lacquer of this character in connection with which our invention may be used advantageously to avoid the slowing action on the rubber cure and at the same time improve the lacquer, may for example be composed of nitrocellulose, a plasticizer and one or more solvents together with such pigments, dulling agents and the like as may be required to give the lacquer the desired color and surface finish. Such lacquer may be made according to the following basic formula:

| | |
|---|---|
| Nitrocellulose (35½% solution, ½ second viscosity) | 113 lbs. |
| Plasticizer (Paraplex Rg-2 60%) | 150 lbs. |
| Solvents: | |
| Amyl acetate | 37 lbs. 8 oz. |
| Ethyl acetate | 110 lbs. |
| Butyl acetate | 180 lbs. |
| Solvent naphtha (No. 8 solvent) | 145 lbs. |

The usual pigments or coloring are added to the above, as for example:

| | |
|---|---|
| Pigments: | |
| "Titanox A" | 20 lbs. 10 oz. |
| Red oxide | 1 lb. 9 oz. |
| Ultramarine Blue | 6 oz. |
| Cadmolith Yellow | 4 lbs. 5 oz. |
| Spectra Black | 2 lbs. 4 oz. | and we also include a dulling agent, such as

| | |
|---|---|
| Zinc stearate | 26 lbs. |

To this lacquer there is added, in accordance with our invention, a quantity of sulfur and also a quantity of accelerator which latter may be of the group of mercaptans and derivatives such as mercaptobenzothiazole, which is known commercially as "Captax," the amount of sulfur and Captax which we have found it advantageous to use with the lacquer batch of the above formula being as follows:

| | Pounds |
|---|---|
| Sulfur | 22 |
| Captax | 22 |

Other accelerators of the same group may be used, such as benzothiazyl disulfide, which is known commercially as "Altax," or accelerators of other groups may be used, as for example guanidines of which diorthotolyl guanidine, known commercially as "DOTG," and diphenyl guanidine, known commercially as "DPG," are representative, salts of dithioacids of which zinc dimethyldithio carbamate, known commercially as "Zimate," and zinc diethyldithio carbamate, known commercially as "Ethyl Zimate," are representative, thiuram sulfides of which tetramethylthiuram disulfide, known commercially as "Tuads (XKA)," and tetramethylthiuram monosulfide, known commercially as "Monex," are representative, aldehyde amines of which heptaldehyde-aniline, known commercially as "Heptene Base," and butyl aldehyde-aniline, known commercially as "Beutene," are representative, amines, of which p-nitrosodimethylaniline is representative, and thioureas, of which thiocarbanilide is representative. Moreover, mixtures of accelerators may be employed. Some accelerators will discolor light colored lacquers, and these, of course, should be used only with lacquers sufficiently dark that they do not discolor.

Preferably the sulfur and accelerator are ground up in a ball mill with lacquer thinner, such as amyl acetate, into a paste which is stirred into the finished lacquer, although the sulfur and accelerator may be added to the lacquer-making materials and ground up therewith in the regular manner of making lacquer. In the latter case, a stiff foam is developed on the surface of the lacquer which is merely skimmed off.

The amounts of sulfur and accelerator vary according to the type of stock with which the lacquer is used, the length and severity of the cure, the kind of lacquer, the total amount of solids therein, the heaviness of the lacquer film, the hardness of coating desired, and the efficiency of the accelerator or accelerators used. As much as 10 per cent each on the weight of the lacquer of sulfur and accelerator may be used beyond which percentage further addition does not appear to be beneficial although best results have been obtained by using between 1 per cent and 5 per cent each of sulfur and accelerator on the weight of the finished lacquer or approximately 15 per cent of the weight of the plasticizer.

After coating the rubber surface with the modified lacquer, the rubber is vulcanized and the lacquer at the same time dried and baked on the rubber, a dry cure at atmospheric pressure being employed for the purpose. The time and temperature may vary and will be understood according to the character of rubber compound and lacquer coating and other circumstances, but we have found that a satisfactory cure of the rubber and baking of the lacquer is ordinarily accomplished by subjecting the lacquered rubber for a period of approximately three and one-half hours to temperature conditions approximately as follows:

15 minutes—raise temperature gradually to 150° F.
30 minutes—raise temperature gradually to 214° F.
30 minutes—raise temperature gradually to 242° F.
30 minutes—raise temperature gradually to 260° F.
1 hour and 45 minutes, hold temperature at 260° F.

With this sulfur and accelerator modification of the lacquer, not only is the rubber properly cured without any slowing action on the cure or detrimental effects on the quality of the rubber such as have been experienced heretofore with lacquer coated rubber, but moreover the lacquer coating and its adhesive or bonding properties are also improved. The lacquer coating has a harder surface with greater resistance to abrasion but without any sacrifice or loss of flexibility as it withstands bending strains as well or better than previous lacquers. Moreover, it has better ageing qualities than previous lacquers, is less susceptible to discoloration on exposure to light and has been found to have exceptionally good adhesion to metal when baked thereon.

While we have in the foregoing description of our invention included as illustrative thereof a preferred embodiment, we are aware that various changes and modifications may be made without departing from the spirit of the invention, the scope of which is to be determined from the appended claims.

We claim as our invention:

1. In making a lacquer coated vulcanized rubber product by coating the rubber with lacquer and conjointly baking the lacquer and vulcanizing the rubber, the method of counteracting the lacquer retardation of the rubber cure including the step before coating of incorporating rubber vulcanization materials including substantial quantities of sulfur and rubber vulcanization accelerator in the lacquer.

2. In making a lacquer coated vulcanized rubber product by coating the rubber with lacquer and conjointly baking the lacquer and vulcanizing the rubber, the method of counteracting the lacquer retardation of the rubber cure which includes the step of incorporating sulfur and one or more rubber vulcanization accelerators in the lacquer before application of the lacquer to the rubber.

3. In making a lacquer coated vulcanized rubber product by coating the rubber with lacquer and conjointly baking the lacquer and vulcanizing the rubber, the method of counteracting the lacquer retardation of the rubber cure including the step before coating of incorporating in the lacquer sulfur and one or more rubber vulcanization accelerators from the group consisting of: mercaptans and derivatives, guanidines, salts of dithioacids, thiuram sulfides, aldehyde amines, amines or thioureas.

4. In making a lacquer coated vulcanized rubber product by coating the rubber with lacquer and conjointly baking the lacquer and vulcanizing the rubber, the method of counteracting the lacquer retardation of the rubber cure which includes the step of incorporating in the lacquer, before application thereof to the rubber, an amount of sulfur not exceeding ten per cent of the weight of the lacquer and approximately the same amount of one or more rubber vulcanization accelerators.

5. A lacquered rubber material comprising a rubber part with a lacquer coating thereon containing a substantial amount of sulfur and rubber vulcanization accelerator, said rubber part and lacquer coating being respectively vulcanized and dried in conjunction with one another, said rubber being wholly and completely cured by virtue of the presence of said vulcanization accelerator in said coating.

6. A lacquered rubber material comprising a rubber part with a lacquer coating thereon containing sulfur and a rubber vulcanization accelerator, said rubber part and lacquer coating being respectively vulcanized and dried in conjunction with one another, said rubber being wholly and completely cured by virtue of the presence of sulphur and said vulcanization accelerator in said coating.

7. A lacquered rubber material comprising a rubber part with a nitrocellulose lacquer coating thereon containing a substantial amount of sulfur and rubber vulcanization accelerator, said rubber part and lacquer coating being respectively vulcanized and dried in conjunction with one another, said rubber being wholly and completely cured by virtue of the presence of said vulcanization accelerator in said coating.

8. In the making of a lacquer coated vulcanized rubber product by coating the unvulcanized rubber with a nitrocellulose lacquer and subsequently conjointly baking the lacquer and vulcanizing the rubber, the method of counteracting the lacquer retardation of the rubber cure which comprises incorporating in the nitrocellulose lacquer prior to coating the rubber therewith a quantity of sulphur and at least one vulcanization accelerator, said materials acting to counteract retardation of the rubber cure by the lacquer when the coated product is subjected to vulcanization and baking temperatures.

PAUL L. BUSH.
DALE E. LOVELL.